Nov. 11, 1969  C. J. SCHWARTZ  3,477,125

METHOD OF MAKING A DOUBLE INSULATED ARMATURE

Filed July 20, 1967

INVENTOR/S

CHRISTIAN J. SCHWARTZ,

BY *Melville, Strasser, Foster and Hoffman*
ATTORNEYS

United States Patent Office 3,477,125
Patented Nov. 11, 1969

3,477,125
METHOD OF MAKING A DOUBLE INSULATED ARMATURE
Christian J. Schwartz, Springfield, Ohio, assignor to Robbins & Myers, Inc., Springfield, Ohio, a corporation of Ohio
Filed July 20, 1967, Ser. No. 654,839
Int. Cl. H02k *15/02, 15/10*
U.S. Cl. 29—596      8 Claims

ABSTRACT OF THE DISCLOSURE

This disclosure relates to a double insulated armature assembly wherein the core laminations and the commutator are insulated from the shaft by a suitable sleeve of nonconductive material. More particularly, the disclosure covers the means for achieving the foregoing in a simple and economical manner. This is accomplished by inserting a serrating tool through the bore of an assembled stack of core laminations to displace the core metal a slight amount toward the center of the bore to form minute tangs at spaced intervals about the bore. In the finally assembled condition, the tangs bite into the nonconductive sleeve thereby fixing the core against relative movement with respect to the shaft.

BACKGROUND OF THE INVENTION

In the manufacture of power supplies for tools in the metal and woodworking trades, especially portable electric tools and the like, safety authorities have required three conductor power cords. That is, a grounded power cord was necessary to eliminate the chance for an electrically "hot" tool shaft. In order to satisfy such authorities and use only a two conductor power cord, it has been proposed that the core laminations and the commutator be insulated from the tool shaft by means of nonconductive materials such as plastic or glass. However, satisfaction of this one problem added further problems in the manufacturing of the armature assemblies. The major shortcoming in the prior art devices became apparent when the motors were subjected to shock or reversing loads. While the sleeve or nonconductive member was fixed against relative movement about the tool shaft, the core tended to slip on the sleeve as a result of the large tangential force from said shock. One method of preventing this slip is to bond the core to the sleeve with an adhesive. However, adhesive bonding of the core is a slow, costly method of assembly. The economics of such a device is drastically reduced.

A second prior art proposal is to punch the core laminations with multiple tangs projecting into the bore. The tangs form splines in the assembled stack of laminations and these splines bite into the plastic or nonconductive tube locking the parts against relative rotation. In a similar manner, the shaft is provided with serrations or splines which engage the bore of the tube, thereby preventing slippage of the tube with respect to the shaft. Thus, while this method may be effective, the provision of tangs in the lamination bore is expensive in terms of die manufacture and maintenance. Finally, care must be used to keep the tangs aligned when pressing the prepared laminations onto the tube or sleeve.

In contrast to the above, it is a primary feature of this invention to provide an economic method of preparing the core laminations and assembling them on an insulated shaft to produce an armature suitable for use in a two conductor power cord electric motor.

SUMMARY OF THE INVENTION

A typical armature assembly for use in a portable electric motor comprises three primary components, i.e., a core composed of a stack of steel laminations, a shaft or rotor disposed therein, and a commutator. While each of said elements are fixed against relative movement with respect to one another, they are adapted to rotate at high speeds within a field yoke or frame. In the present invention, to insure against relative movement between the several components, a nonconductive sleeve is provided between the shaft and the core. The shaft or rotor in the present assembly is provided with a series of longitudinally extending ridges which bite into a nonconductive sleeve pressed onto said shaft. Simultaneous with this operation, a stack of core laminations are aligned in a press and a serrating tool is inserted into the bore of the stack to produce a plurality of minute tangs on said laminations. In order to accomplish this, a serrating tool, characterized by a plurality of longitudinal ridges extending along the body of the tool and having relief grooves along the sides thereof, is used. Such a tool produces tangs on the order of about 1–1.5% of the diameter of the bore. The shaft having the sleeve thereabout is machined to approximately the diameter of the bore and pressed into the stack of laminations. These minute tangs bite into the nonconductive sleeve thereby fixing the core against movement with respect to the sleeve and the shaft. The assembly is completed by pressing the commutator on an insulated portion of the shaft.

DETAILED DESCRIPTION OF THE DRAWING

Figure 1:
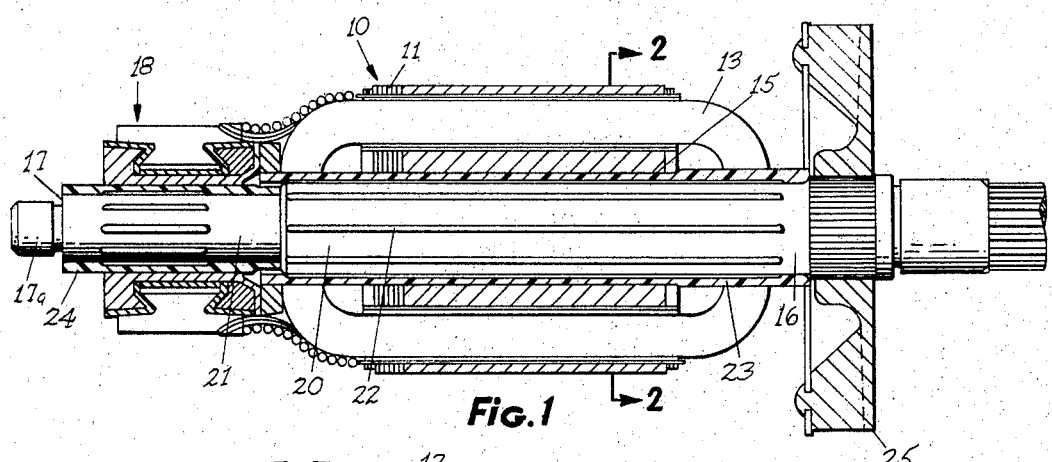
FIGURE 1 is a sectional view of an armature assembly utilizing core laminations produced by the method described herein.
Figure 2:
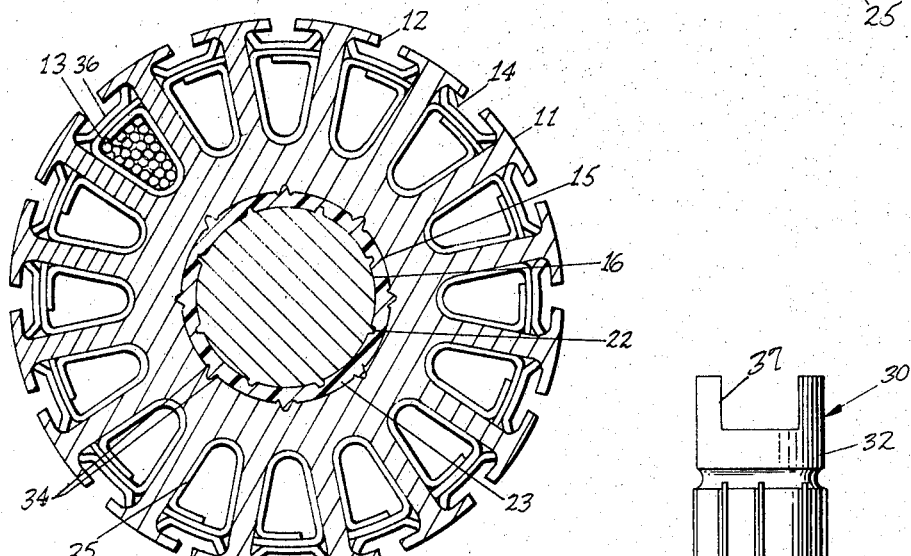
FIGURE 2 is an enlarged sectional view, with parts removed, taken along line 2—2 of FIGURE 1.

In the manufacture of electric motors, an armature assembly 10, such as shown in FIGURE 1, is prepared and adapted to rotate within a field yoke or frame (not shown). Such an assembly comprises an armature which is cylindrical in configuration but composed of a series of stacked laminations 11, having a tooth-and-slot surface 12. The surface 12 is best illustrated in FIGURE 2. The armature winding consists of many coils 13, only one of which is shown in FIGURE 2, which fill the slots 14 on the armature surface 12. The laminations are characterized by a bore 15 within which is provided a shaft 16 or rotor. A cooling fan 25 may be provided on the shaft, and one end of the shaft may be adapted for driving the working tool.

Surrounding one end 17 of shaft 16 is a commutator indicated generally at 18. The particular commutator illustrated herein forms no limitation on the invention except in the manner to be described hereinafter. The manufacturing and functioning of commutators are known in the electrical motor field. In review then, the core laminations 11, the shaft 16, and commutator 18 are the three primary components of the armature assembly 10.

Due to the function of shaft 16 as the means to drive the tool, provision must be made to protect the operator from contacting an electrically "hot" shaft resulting from a malfunctioning motor. One of the earliest methods used was the grounded three conductor power cord. This in time gave way to an insulated system using only a two conductor power cord. However, in such a system the wound core laminations had to be insulated from the shaft, yet capable of rotation therewith.

The present invention accomplishes the latter result in a unique manner. The shaft 16, having a major portion 20 to receive the stacked laminations and a minor portion 21 for the commutator 18, is provided with spaced apart longitudinal ridges 22 along the respective portions of the shaft. A sleeve 23, or jacket of tubing, is pressed onto the major portion 20. Similarly, a sleeve 24 is pressed onto the minor portion. With such a fit, the sleeves are fixed against rotation about the shaft. Since the function of the sleeve is to insulate, they are made of nonconductive materials such as fiberglass or plastic. A material found suitable for the practicing of this invention is Spauldite G–10 tubing, manufactured by the Spaulding Fibre Co., Inc.

Since the tolerance is close in the assembling of such an armature, each sleeve is ground or machined to approximately the diameter of the elements fitted thereon. In the case of sleeve 23, the final diameter equals the diameter of the bore of the stacked laminations. For example, where the bore of the laminations is .625", the sleeve will be ground to .6240±.0005.

Simultaneously with the above operations, a stack of core laminations are being prepared for the armature assembly. A stack of punched steel laminations are lined in a press or core building cage in preparation for receiving the tools shown in FIGURES 3 and 4.

Figure 3:
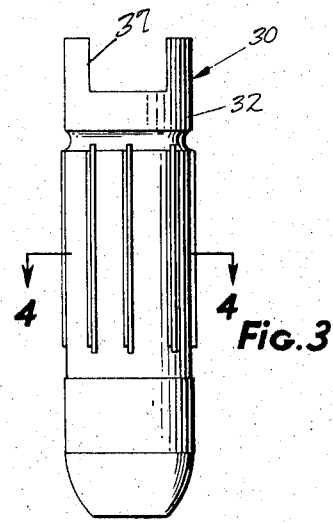
FIGURE 3 is a plan view of a serrating tool capable of producing the bore configuration for the core laminations.
Figure 4:
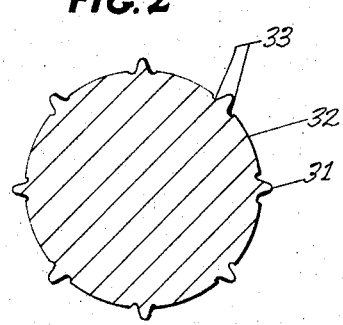
FIGURE 4 is a sectional view of the tool shown in FIGURE 3 taken along the line 4—4.

The serrating tool 30 at FIGURES 3 and 4 is designed to displace and not remove the relatively soft steel of the laminations. This objective is accomplished by providing for a series of spaced apart longitudinal ridges 31 along the shaft 32 of the tool. Relief, in the form of grooves 33 along each side of the ridges 31, have been provided to permit the flow of metal from the core laminations toward the center of the bore. In one embodiment of this invention, the height of a ridge was only .007 inch, or a diameter increase of about 1.6%. With such a tool, it is possible to provide minute tangs projecting into the bore of the laminations on the order of about 1–1.5% of the bore diameter.

With the stack of laminations aligned in a press, the tool 30 is pushed through the stack displacing the metal in the manner shown in FIGURE 2. Utilizing this particular tool, a double tang 34 is produced at each location of the corresponding ridge on the tool. While the exact number of tangs on a given lamination may vary between assemblies, a sufficient number is required to insure a gripping of the sleeve 23. The assembled stack of laminations are then pressed onto the insulated major portion 20 of shaft 16. As an alternative to this sequence, sleeve 23 may be pressed into the laminated core. Following this, the shaft may be pressed into the bore of the sleeve.

In the first sequence of operations described above, it has been determined that the serrating and pressing operations can be effected in a continuous step. With the sleeve 23 securely in place about the major portion 20, tool 30 is aligned with the minor portion 21 in contact with the end 17. To facilitate the alignment, a recess 37 may be provided in the tool 30 to receive the projection 17a. Through this arrangement, the stack of laminations 11 may be moved along the tool 30 and guided over the sleeve 23 in an uninterrupted motion. While several systems may be employed to effect this movement, a hydraulic press and guide bars have been found suitable. This should not be read as a limitation on this invention, however, as other systems could be readily derived by those skilled in the art, particularly after reading these specifications.

To complete the armature assembly, the core slots 14 are insulated 35 and wound such as at 13. These windings are held firmly in place by wedges 36. The final operation is the pressing of the commutator 18 onto the minor portion 21 of shaft 16. The armature assembly is now ready for installation in the field yoke.

It should be apparent from the foregoing, especially to one skilled in the art, that modifications may be made herein without departing from the spirit and scope of the invention. Therefore, no limitation is intended to be imposed herein, except as set forth in the appended claims.

The embodiments of the invention in which an exclusive property or privilege is claimed are defined as follows.

I claim:

1. In a method for assembling an armature having a core composed of a stock of laminations, and a shaft adapted to be received in the bore of said core and insulated therefrom, the improvement comprising in combination therewith, the steps of surrounding said shaft with a nonconductive material, aligning a stack of circular core laminations having a central bore therein, uniformly displacing at spaced localized areas about the bore of each of said laminations a minute portion of said lamination toward its center, and pressing said shaft into the bore formed by said stack of core laminations, thereby causing said minute portions to become engaged with said nonconductive material.

2. The method for assembling an armature as claimed in claim 1 wherein said dispacing and pressing are sequential operations in a single uninterrupted step.

3. The method for assembling an armature as claimed in claim 1 including the step of machining said nonconductive material to an outside diameter approximately equal to the diameter of said bore, and wherein said nonconductive material is a member selected from the group consisting of fiber glass and plastic.

4. The method for assembling an armature as claimed in claim 3, wherein said laminations are displaced at each location on the order of 1–1.5% of the bore radius.

5. The method for assembling an armature as claimed in claim 3, wherein said displacement is effected by means of a serrating tool comprising a shaft having a plurality of longitudinal ridges extending along a portion of said shaft.

6. The method for assembling an armature as claimed in claim 5, wherein said serrating tool is further characterized by grooves extending along the sides of each of said ridges.

7. The method for assembling an armature as claimed in claim 6, wherein said grooves are sufficient to permit a displacement on the order of 1–1.5% of the bore radius.

8. In a method for assembling an armature having a core composed of a stack of laminations, and a shaft adapted to be received in the bore of said core and insulated therefrom, the improvement comprising in combination therewith, the steps of aligning a stack of circular core laminations havng a central bore therein, uniformly displacing at spaced localized areas about the bore of each of said laminations a minute portion of said lamination toward its center, inserting a cylindrical nonconductive material into said bore in contact with said minute portions, and inserting said shaft into the bore of said cylindrical nonconductive material, thereby causing said minute portions to become engaged with said nonconductive material.

References Cited

UNITED STATES PATENTS

| 2,838,703 | 6/1958 | Balke | 29—609 X |
| 2,916,816 | 12/1959 | Black et al. | 29—507 |
| 3,080,615 | 3/1963 | Carlson et al. | 29—597 |
| 3,413,498 | 11/1968 | Bowen et al. | 310—50 X |

JOHN F. CAMPBELL, Primary Examiner

CARL E. HALL, Assistant Examiner

U.S. Cl. X.R.

29—507, 598, 609; 310—42, 50, 216